United States Patent
Tomasi et al.

(10) Patent No.: US 9,090,327 B2
(45) Date of Patent: Jul. 28, 2015

(54) INTERMEDIATE SUPPORT STRUCTURE FOR THE COCKPIT OF AN AIRCRAFT

(75) Inventors: Marc Tomasi, Toulouse (FR); Patrick Lieven, Fronton (FR); Romain Delahaye, Colomiers (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 117 days.

(21) Appl. No.: 13/541,188

(22) Filed: Jul. 3, 2012

(65) Prior Publication Data

US 2013/0009007 A1    Jan. 10, 2013

(30) Foreign Application Priority Data

Jul. 5, 2011    (FR) ...................................... 11 56059

(51) Int. Cl.
| | |
|---|---|
| *B64D 11/00* | (2006.01) |
| *B64C 1/06* | (2006.01) |
| *B64C 1/18* | (2006.01) |
| *B64D 13/00* | (2006.01) |
| *B64D 43/00* | (2006.01) |

(52) U.S. Cl.
CPC . *B64C 1/068* (2013.01); *B64C 1/18* (2013.01); *B64D 11/00* (2013.01); *B64D 13/00* (2013.01); *B64D 43/00* (2013.01); *B64D 2011/0046* (2013.01); *Y02T 50/44* (2013.01); *Y02T 50/46* (2013.01)

(58) Field of Classification Search
CPC .... B64D 11/06; B64D 11/00; B64D 11/0689; B64D 2011/0076
USPC .................................... 244/118.5, 118.6, 221
See application file for complete search history.

(56) References Cited

U.S. PATENT DOCUMENTS

| | | | |
|---|---|---|---|
| 2,263,365 A |   | 11/1941 | Friedrich et al. |
| 2,702,680 A | * | 2/1955 | Heinemann et al. .......... 244/140 |
| 3,704,845 A | * | 12/1972 | Ord ................................ 244/121 |
| 3,999,728 A | * | 12/1976 | Zimmer ......................... 244/140 |
| 5,544,842 A | * | 8/1996 | Smith et al. .................... 244/1 R |
| 5,810,178 A |   | 9/1998 | Boette et al. |
| 6,497,388 B1 |   | 12/2002 | Friend et al. |
| 6,915,985 B2 | * | 7/2005 | Arias .......................... 244/118.5 |

(Continued)

FOREIGN PATENT DOCUMENTS

| | | |
|---|---|---|
| EP | 0 283 926 | 9/1988 |
| FR | 842 220 | 6/1939 |

(Continued)

OTHER PUBLICATIONS

French Search Report and Written Opinion for Application No. FR 1156059 dated Dec. 30, 2011.

*Primary Examiner* — Timothy D Collins
*Assistant Examiner* — Jamie S Stehle
(74) *Attorney, Agent, or Firm* — Jenkins, Wilson, Taylor & Hunt, P.A.

(57) ABSTRACT

An intermediate support structure for the cockpit of an aircraft is provided. The intermediate support structure includes a raised floor and at least one structural element extending as an arch above the raised floor, the arched structure being adapted to hold in position at least one item of equipment in the upper part of the cockpit. The intermediate support structure also includes a fastener for mounting the intermediate support structure onto a fuselage primary structure, where the fuselage primary structure defines a portion of the cockpit of the aircraft.

20 Claims, 4 Drawing Sheets

(56) References Cited

U.S. PATENT DOCUMENTS

| | | | |
|---|---|---|---|
| 8,028,960 B2 | 10/2011 | Van Wassenhove et al. | |
| 8,308,108 B2 * | 11/2012 | Cazals et al. | 244/119 |
| 2011/0036946 A1 * | 2/2011 | Depeige et al. | 244/120 |

FOREIGN PATENT DOCUMENTS

| | | |
|---|---|---|
| FR | 2 900 634 | 11/2007 |
| FR | 2 930 521 | 10/2009 |
| WO | WO 2010/108954 | 9/2010 |

\* cited by examiner

INTERMEDIATE SUPPORT STRUCTURE FOR THE COCKPIT OF AN AIRCRAFT

CROSS-REFERENCE TO RELATED APPLICATIONS

This application claims priority to French Patent Application No. 11 56 059 filed on Jul. 5, 2011, the entire content of which is incorporated by reference herein.

BACKGROUND

The present invention relates to an intermediate support structure for an aircraft cockpit.

The present invention also relates to an aircraft comprising a fuselage primary structure defining a portion of a cockpit, integrating such intermediate structure.

Generally, this invention relates to the implementation of various systems and equipment in a cockpit of an aircraft.

In the following description, "front" shall denote elements closest to the nose of the aircraft and "rear" elements furthest from the nose of the aircraft.

Traditionally, the installation of electrical wiring systems, air conditioning systems and cockpit furnishing systems is carried out inside the cockpit section as defined by the fuselage primary structure of an aircraft, after the latter has been fully completed.

However, in such cockpit section, space is limited and the number of people who can work simultaneously in this part of the aircraft has to be restricted.

In addition, the floor area, in particular the technical area available under the floor is not easily accessible, which complicates the integration into the cockpit of the various systems fitting it.

SUMMARY

The present invention aims at solving one of the aforementioned drawbacks and proposes an intermediate support structure for the cockpit for installing various equipment with greater ease.

To this end, the present invention relates to an intermediate support structure for the cockpit of an aircraft having a raised floor and at least one structural element extending as an arch over the raised floor, said arch structure being adapted to hold in position at least one item of equipment in the upper part of the cockpit, and having means to secure the intermediate structure to a primary structure of the fuselage defining a portion of the cockpit of an aircraft.

Advantageously, the intermediate support structure according to the invention further comprises structural elements adapted to hold in position at least one item of equipment of a system selected from an electrical wiring system, an air conditioning system and a cockpit furnishing system.

Thus, the intermediate support structure is a structure for holding in position various items of equipment of a cockpit, said intermediate structure is then brought into the primary structure.

Therefore, the installation of equipment for the various electrical wiring, air conditioning and furniture systems can be easily performed, and in particular without being impacted by the presence of the primary structure that limits the space available in the installation area.

In particular, the use of an intermediate brought-in structure provides external access to this area that will become part of the cockpit, thus facilitating the installation by one or more operators of various items of equipment, including cable routing, positioning of screens or trim items.

Moreover, holding such equipment in position is done on the structural elements of the intermediate structure, thus limiting the number of junction or securing points traditionally required for holding in position such equipment in the fuselage primary structure.

Thus, the fuselage primary structure can be preserved by alleviating areas of said primary structure, necessarily occurring in the prior art, weakened from holes or connecting structures provided for holding equipment in position directly on the primary structure.

According to one characteristic of the invention, said intermediate support structure includes a raised floor suitable for routing at least one equipment of one system selected from an electrical wiring system and an air conditioning system.

Realizing a raised floor outside of the fuselage primary structure facilitates the access to the technical area traditionally provided under a cockpit floor for routing electrical wires or air ducts for an air conditioning system.

In a practical embodiment, the raised floor consists of linear structural elements arranged in a lattice, the raised floor being covered with a walking floor over a top face.

Such raised floor lattice structure best reduces the weight of the intermediate structure brought into the fuselage primary structure.

According to one embodiment of the invention, the structural elements are made of tubes of composite material in order to obtain a light and flexible intermediate structure.

In particular, said structural elements can be adapted to route air inside the tubes for an air conditioning system.

The intermediate structure can thus be directly used as part of the air conditioning system, for air circulation.

The intermediate support structure according to the invention is such that at least one element of the arched structure comprises means for routing one or more wires of a wiring system connected to the equipment in the upper part of the cockpit.

According to another characteristic, the intermediate structure can be adapted to support insulation boards.

The present invention also relates, according to a second aspect, to an aircraft comprising a fuselage primary structure defining a portion of a cockpit.

According to the invention, such aircraft includes an intermediate support structure according to the invention, secured inside the primary structure.

The integration of such intermediate structure presents characteristics and advantages similar to those described above in connection with the intermediate structure of the invention.

According to one embodiment, the aircraft also includes structural holding devices for one or more items of equipment held in position within the intermediate structure, the structural holding devices connecting said item(s) of equipment to the primary structure.

Thus, the role of the intermediate structure is limited to holding in position one or more items of equipment.

It does not need to be designed to withstand dynamic loads.

Structural holding devices are specifically designed for holding equipment with dynamic loads, connecting such equipment with devices adapted to the primary structure.

Thus, the intermediate structure can be realized in a lightweight composite structure, since it does not have a role in holding the structural integrity of the equipment or in supporting dynamic loads.

In a practical embodiment of the invention, the aircraft comprises equipment in the upper part of the cockpit held in position onto the intermediate structure, with structural holding rods arranged between the primary structure and the equipment in the upper part.

Other features and advantages of the invention will become apparent from the description below.

BRIEF DESCRIPTION OF THE DRAWINGS

In the accompanying drawings, provided as non-limiting examples.

DETAILED DESCRIPTION

An intermediate structure for supporting a cockpit of an aircraft according to one embodiment of the invention shall first be described with reference to FIG. 1.

Figure 1:
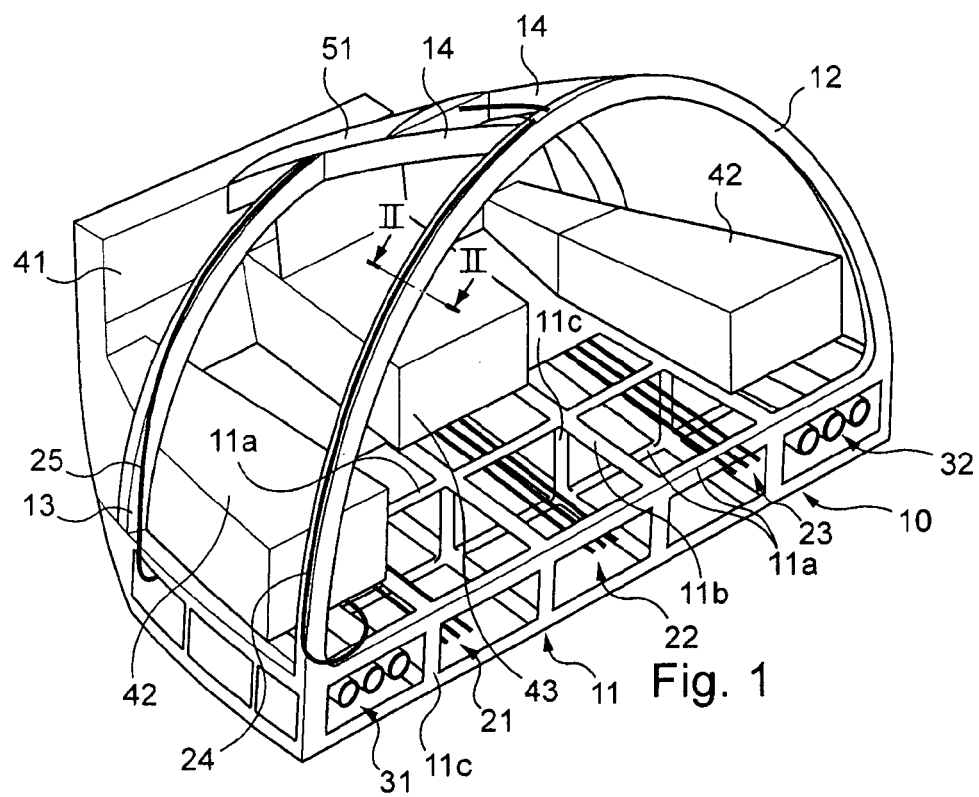
FIG. 1 is a schematic view in perspective of an intermediate structure according to one embodiment of the invention, for holding various items of equipment in position in a cockpit.

As clearly shown in FIG. 1, said intermediate structure 10 includes structural elements 11 intended to constitute a raised floor, forming the base or pedestal of the intermediate structure.

The intermediate structure includes at least one structural element 12, 13 extending as an arch above the raised floor and supporting equipment 51 in the upper part of the cockpit, in particular a control panel (also known as Overhead Panel) or a display screen.

Referring generally to standards recognized, controlled and published by ATA (Air Transport Association), a cockpit of an aircraft includes in particular an air conditioning system (referenced as ATA 21), electrical installation systems (referenced as ATA 92), and cockpit furnishing and equipment systems (referenced as ATA 25).

As clearly shown in FIG. 1, in one embodiment, intermediate structure 10 is further adapted for supporting and holding in position various items of equipment of such systems, in particular for routing electrical wiring system cables 21, 22, 23, 24, 25, and positioning various air conditioning system ducts 31, 32.

Said intermediate structure 10 is also designed to support various cockpit furnishing and layout equipment.

In this embodiment, and as a non-limiting example, the intermediate structure is adapted to support cockpit dashboard 41, side benches 42, or else a center console 43 extending between two flight compartments.

These different items of equipment may consist namely of screens used to fly the aircraft.

Preferably, the raised floor consists of linear structural elements 11a, 11b, 11c arranged in a lattice.

Below, the description of the intermediate structure in the space, and in particular the longitudinal and transverse dimensions of such structure correspond to the longitudinal and transverse direction of the fuselage of the aircraft for integrating such brought-in intermediate structure.

Raised floor 11 is thus formed from an assembly of cross elements 11a interconnected by longitudinal elements 11b in the same plane.

Two planes are thus formed and connected parallel to each other through spacers 11c extending in the depth of raised floor 11.

In this embodiment, the arrangement of cross elements 11a, longitudinal elements 11b, spacers 11c is performed according to a network with attachment ties common to said linear structural elements 11a, 11b, 11c.

This lattice structure thus comprises spaces between the various linear structure elements 11a, 11b, 11c for routing notably electrical wiring system 21, 22, 23 or air conditioning system 31, 32.

In this embodiment, the routing of cables 21, 22, 23 and the arrangement of air ducts 31, 32 are parallel to longitudinal elements 11b of the raised floor.

Although not shown in FIG. 1, the intermediate structure also includes a walking floor placed on the upper face of raised floor 11, for people movements in the cockpit.

The intermediate structure also includes, in addition to said raised floor 11 extending in one plane, structure elements 12, 13 extending as arches above raised floor 11.

In this embodiment, and as a non limiting example, the intermediate structure comprises two arches 12, 13 connected to each other by connecting structure elements of 14.

Thus, each arch 12, 13 is held in position at its ends over raised floor 11.

In addition, the holding in position and the spacing between the two arches 12, 13 is provided by connecting structure elements 14 extending respectively between the two arches 12, 13, in the upper part of each arch.

In this embodiment, arched structural elements 12, 13 are adapted to hold equipment 51 in position in the upper part of the cockpit.

Figure 2:
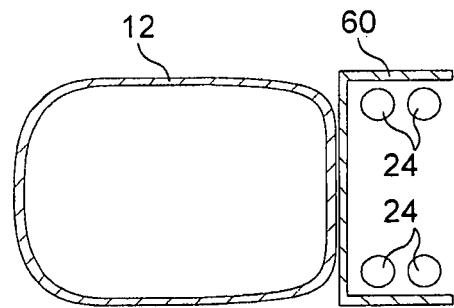
FIG. 2 is a cross-section view along line II-II in FIG. 1.

A cross section view of an arched structural element 12 is shown in FIG. 2.

As clearly shown in FIG. 2, the first arched structural element 12 includes routing means 60 for one or more wires 24 to be connected to equipment 51 in the upper part of cockpit 51.

In this embodiment, routing means 60 consist of a chute, for example of cross-sectional U-shaped Said chute 60 is preferably integrated into first structural arched element 12 and for example is a metallic material to provide the ESN (abbreviation for Electrical Structural Network) function.

Of course, identical routing means may be provided on the second structural arched element 13 for holding in position one or more wires 25, for example, for connecting equipment 51 to the upper part of the cockpit.

Note that this cross-sectional view is not limited to routing means 60 as described above, but presents a hollow area 8, e.g. for routing an air duct of an air conditioning system.

In another embodiment not shown in the figures, the routing zone for the air conditioning system ducts is a flexible duct running along arch 12.

FIG. 2 also corresponds to a cross section in this embodiment of the various linear structural elements 11a, 11b, 11c constituting raised floor 11, and various structural elements 12, 13, 14 extending above raised floor 11.

Thus, in this embodiment, structural elements 11a, 11b, 11c, 12, 13, 14 are made of composite material tubes.

The use of a composite material hollow structure is to lighten intermediate structure 10.

Furthermore, the inside of each structural element is in the form of a tube that can be used for routing air for an air conditioning system.

Figure 3A:
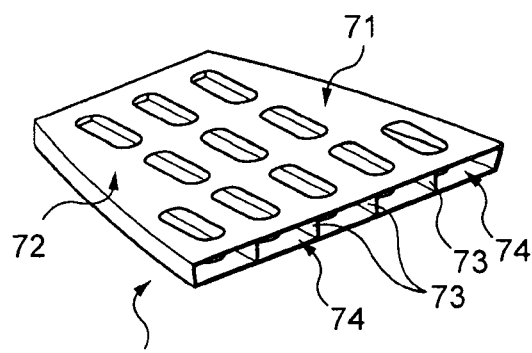
FIGS. 3A and 3B are schematic views in perspective showing an example of a raised floor of an intermediate structure according to another embodiment of the invention.
Figure 3B:
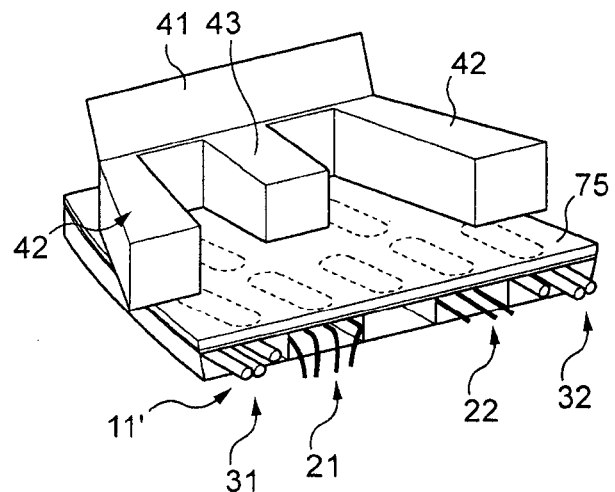

FIGS. 3A and 3B illustrate another embodiment of a raised floor 11' for an intermediate support structure.

In this embodiment, raised floor 11' includes two parallel, composite material walls 71, 72.

Said composite walls have various openings in their plane in order to lighten the structure.

Said two walls 71, 72 made of composite material are further connected by longitudinal bulkheads 73 thereby defining different longitudinal spaces 74 extending within raised floor 11', between said two walls 71, 72.

Said longitudinal spaces 74 are designed for accommodating wires 21, 22 of the electrical wiring system or air ducts 31, 32 of the air conditioning system.

As clearly shown in FIG. 3B, said raised floor 11' is covered with a walking floor 75 over a top face of raised floor 11', corresponding here to upper wall 71.

Although not shown in FIG. 3B, raised floor 11' may also be associated with arched structural elements extending above said raised floor, as described here above in relation with the first embodiment shown in FIGS. 1 and 2.

Figure 4:
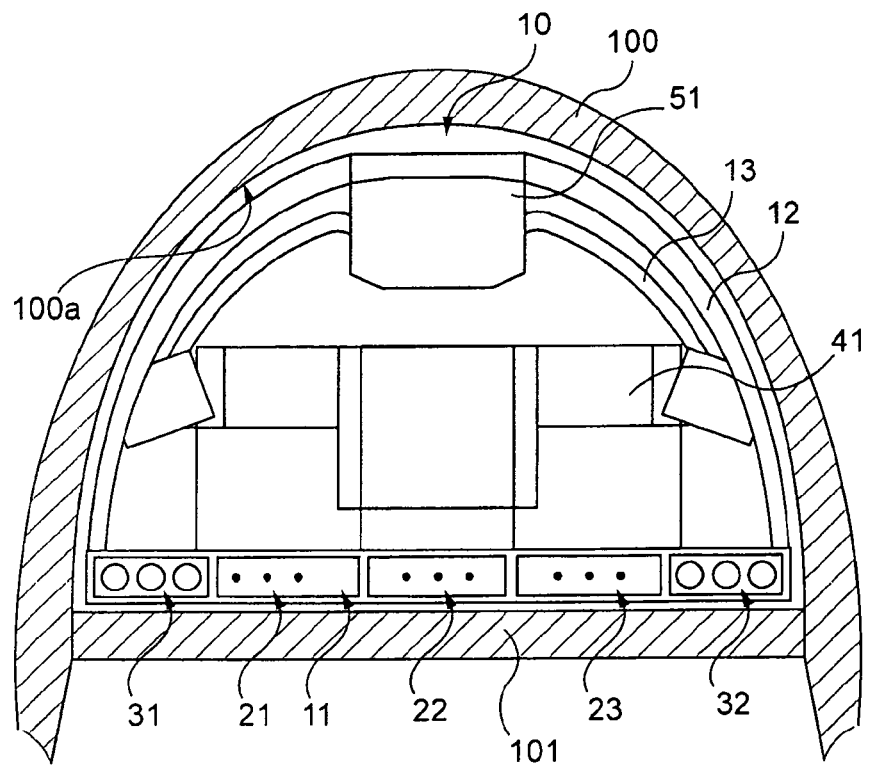
FIG. 4 is a rear view of the intermediate structure in FIG. 1, embedded in a primary structure of the fuselage.

FIG. 4 shows intermediate structure 10, as described here above with reference to FIG. 1, integrated into a primary structure 100 of a portion of an aircraft fuselage intended to be part of the cockpit of the aircraft.

As clearly shown in FIG. 4, raised floor 11 is intended to be placed over floor area 101 of the fuselage primary structure.

Furthermore, arched structural elements 12, 13 have a curvature radius similar to that of fuselage primary structure 100.

Thus, arched structural elements 12, 13 are substantially adapted to match the shape of inner wall 100a of the fuselage primary structure.

In order to enable the integration of said intermediate structure 10 in primary structure 100, intermediate structure 10 comprises means of fastening said intermediate structure to the fuselage primary structure.

Such fastening means may be standards fastening means used in the aeronautic industry.

Please note that, preferably, intermediate support structure 10 is uniquely adapted for supporting and holding in position the different cockpit equipment described above.

Said intermediate structure 10 is not designed to withstand stresses or dynamic loads exerted on these items of equipment.

In this regard, the aircraft also comprises holding structural devices for equipment that is simply held in position within intermediate structure 10.

Such structural holding devices are used to connect said equipment held in position within intermediate structure 10 to primary structure 100 when it is necessary to sustain dynamic stresses and support aircraft loads between primary structure 100 and such equipment.

Figure 5:
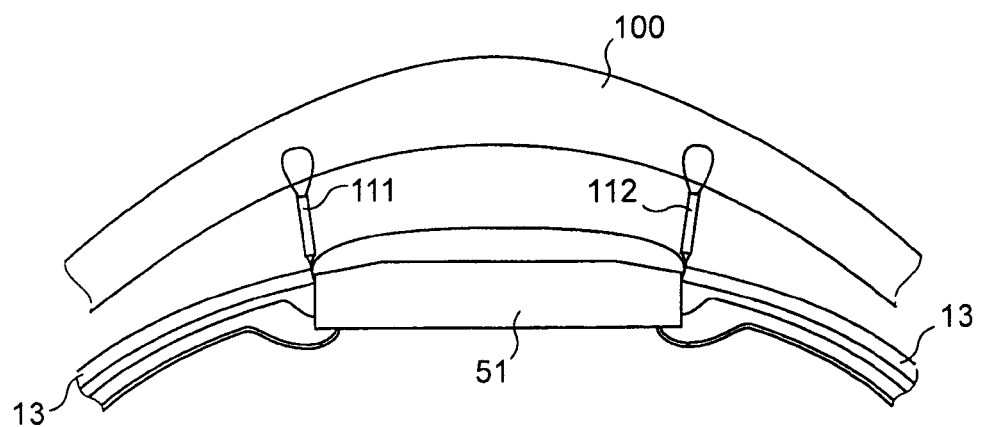
FIG. 5 is a schematic view to show the mounting of equipment held in the upper part of a cockpit of an aircraft according to one embodiment of the invention.

For example, as illustrated in FIG. 5, the structural holding devices 111, 112 are for securing equipment 51 in the upper part of the cockpit to primary structure 100.

Thus, equipment 51 in the upper part of the cockpit is held in position over intermediate structure 10, and specifically on arched structural elements 12, 13 as described above and connecting elements 14.

Furthermore, structural holding rods 111, 112 are provided for supporting dynamic loads acting upon equipment 51 in the upper part of the cockpit.

Said structural holding rods 111, 112 are connected, on the one hand, to primary structure 100 and, on the other, to equipment 51 in the upper part of the cockpit, and help ensure that said equipment 51 in the upper part of the cockpit can withhold dynamic loads.

Figure 6:
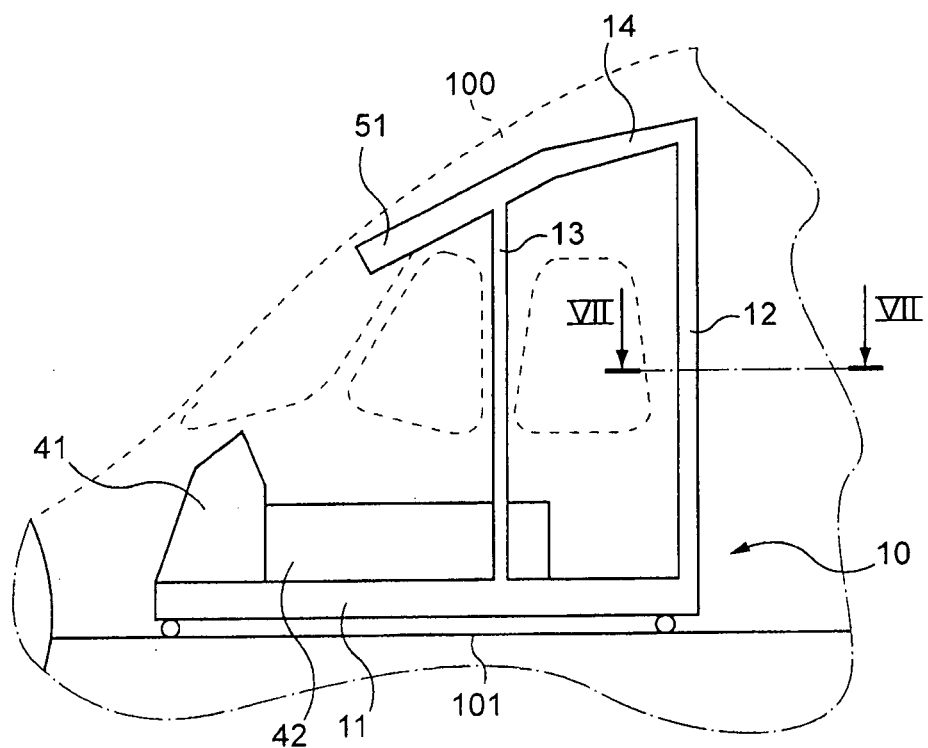
FIG. 6 is a diagram showing the integration of an intermediate structure in a primary structure of the fuselage, defining a portion of the cockpit of an aircraft according to one embodiment of the invention.

Finally, FIG. 6 illustrates the installation of an intermediate structure 10 as described above with reference to FIG. 1, in primary structure 100 of an aircraft fuselage.

This installation step is carried out during the aircraft completion by translating intermediate structure 10 onto floor 101 of primary structure 100.

Please note that using such intermediate structure is possible in a nose cone integration phase, with a finalized primary structure 100.

Thus, when primary structure 100 is completed, intermediate structure 10 is placed behind the nose cone and the assembly is translated within primary structure 100 to its final position.

Although not shown in the previous figures, intermediate structure 10 can be adapted to support insulation boards.

Figure 7:
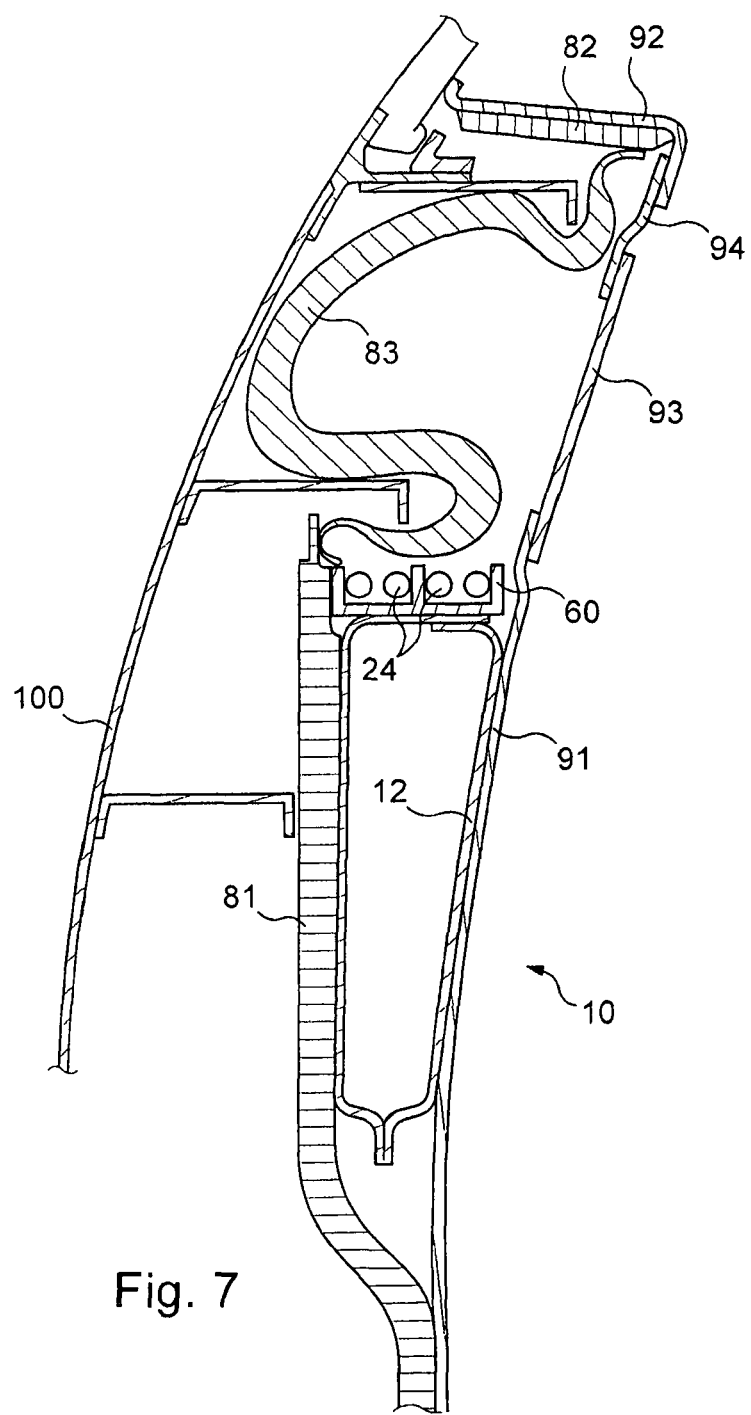
FIG. 7 is a diagram showing the assembly of insulating boards on an intermediate structure, according to a cross-section plane along line VII-VII in FIG. 6.

An example of mounting insulating panels on an element of intermediate structure 10 is shown in FIG. 7.

In FIG. 7, one will note that the elements performing the same function as those previously described bear the same reference number even though their structure may be slightly different.

This embodiment illustrates an arched structure element 12 formed of hollow profile, as described above, for flowing conditioned air inside arched structural element 12.

As mentioned above, said arched structural element 12 may comprise a chute 60 for routing one or more wires 24.

Insulation panels 81, 82 may be integrated within intermediate structure 10. Intermediate structure 10 also comprises trim panels 91, 92, 93, and 94.

As clearly shown in FIG. 7, a first insulation panel 81 is attached to both arched structural element 12 and a portion of a first trim panel 91.

Similarly, a second insulation board 82 is attached to a second trim panel 92.

In addition, an access hatch can be formed by a third trim panel 93 so that, during the assembly of intermediate structure 10 within primary structure 100 of an aircraft fuselage, additional insulation panels may be brought between fuselage structure 100 and intermediate structure 10.

FIG. 7 thus illustrates the positioning of a third insulation board 83, mounted between different mounting flanges united to primary structure 100 of the fuselage or to intermediate structure 10.

Therefore, using an intermediate structure 10 facilitates the mounting of the various insulation panels inside the fuselage.

In general, said insulation boards can be thermoformed, which makes them rigid. Using an intermediate structure as described above may facilitate the installation of the various equipment and trim elements inside a primary structure of an aircraft fuselage.

The invention claimed is:

1. An intermediate support structure for a cockpit of an aircraft, wherein the intermediate support structure comprises:
   a raised floor;
   at least two structural elements arching above the raised floor, the at least two arched structural elements each comprising at least one routing chute and holding in position at least one item of equipment in an upper part of the cockpit;

at least one connecting element extending between the at least two arched structural elements in an upper part of each of the two arched structural elements, such that the at least two arched structural elements are connected to each other by the at least one connecting element; and a fastener for securing the intermediate support structure to a fuselage primary structure.

2. The intermediate support structure according to claim 1, wherein the connecting element, the at least two arched structural elements, and/or the raised floor are adapted to hold in position the at least one item of equipment for a system selected from an electrical wiring system, an air conditioning system, and a cockpit furnishing system.

3. The intermediate support structure according to claim 1, wherein the raised floor passes the at least one item of equipment for a system selected from an electrical wiring system and an air conditioning system.

4. The intermediate support structure according to claim 3, wherein the raised floor comprises linear structural elements arranged in a lattice, the raised floor being covered with a walking floor on an upper face.

5. The intermediate support structure according to claim 1, wherein the at least two arched structural elements, the raised floor, and/or the connecting element are made of composite material tubes.

6. The intermediate support structure according to claim 5, wherein the at least two arched structural elements, the connecting element, and/or the raised floor carry air of an air conditioning system within the composite material tubes.

7. The intermediate support structure according to claim 1, wherein the at least one routing chute routes one or more wires of a wiring system connected to the at least one item of equipment held in the upper part of the cockpit structure by the at least two arched structural elements.

8. The intermediate support structure according to claim 1, wherein the intermediate support structure supports insulating panels.

9. An aircraft comprising a fuselage primary structure defining a portion of a cockpit, wherein the aircraft includes the intermediate support structure according to claim 1, the intermediate support structure attached to the inside of the fuselage primary structure.

10. The aircraft according to claim 9, wherein the aircraft further comprises structural holding devices for one or more items of equipment held in position within the intermediate support structure, the structural holding devices connecting the one or more items of equipment to the fuselage primary structure.

11. The aircraft according to claim 10, wherein the aircraft further comprises equipment in an upper part of the cockpit held in position onto the intermediate support structure, with structural holding rods being arranged between the fuselage primary structure and the equipment in the upper part of the cockpit.

12. The intermediate support structure according to claim 1, wherein the fuselage primary structure defines a portion of the cockpit of the aircraft.

13. An intermediate support structure for a cockpit of an aircraft, wherein the intermediate support structure comprises:

a raised floor comprising linear structural elements with spaces disposed therebetween, the raised floor being disposed over a floor area of a fuselage primary structure;

at least two structural elements arching above the raised floor, the at least two arched structural elements holding in position at least one item of equipment in an upper part of the cockpit;

at least one connecting element extending between the at least two arched structural elements in an upper part of each of the two arched structural elements, such that the at least two arched structural elements are connected to each other by the at least one connecting element; and a fastener for securing the intermediate support structure to the fuselage primary structure, the fuselage primary structure defining a portion of the cockpit of the aircraft.

14. The intermediate support structure according to claim 13, wherein the connecting element, the at least two arched structural elements, and/or the raised floor hold in position the at least one item of equipment for a system selected from an electrical wiring system, an air conditioning system, and a cockpit furnishing system.

15. The intermediate support structure according to claim 13, wherein the raised floor passes the at least one item of equipment for a system selected from an electrical wiring system and an air conditioning system.

16. The intermediate support structure according to claim 15, wherein the linear structural elements of the raised floor are arranged in a lattice, and the raised floor is covered with a walking floor on an upper face.

17. The intermediate support structure according to claim 13, wherein the at least two arched structural elements, the raised floor and/or the connecting element are made of composite material tubes.

18. The intermediate support structure according to claim 17, wherein the at least two arched structural elements, the connecting element and/or the raised floor carry air of an air conditioning system within the composite material tubes.

19. The intermediate support structure according to claim 13, wherein the at least two arched structural elements comprise at least one routing chute that routes one or more wires of a wiring system connected to the at least one item of equipment held in the upper part of the cockpit structure by the at least two arched structural elements.

20. The intermediate support structure according to claim 13, wherein the intermediate support structure supports insulating panels.

\* \* \* \* \*